US012578622B2

(12) United States Patent
Lee et al.

(10) Patent No.: US 12,578,622 B2
(45) Date of Patent: \*Mar. 17, 2026

(54) CAMERA MODULE

(71) Applicant: SAMSUNG ELECTRO-MECHANICS CO., LTD., Suwon-si (KR)

(72) Inventors: Kum Kyung Lee, Suwon-si (KR); Sang Hun Han, Suwon-si (KR); Soo Cheol Lim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 700 days.

This patent is subject to a terminal disclaimer.

(21) Appl. No.: 17/984,432

(22) Filed: Nov. 10, 2022

(65) Prior Publication Data

US 2023/0185162 A1 Jun. 15, 2023

(30) Foreign Application Priority Data

Dec. 9, 2021 (KR) ........................ 10-2021-0175910

(51) Int. Cl.
*G03B 5/04* (2021.01)
*G02B 27/64* (2006.01)
*G03B 13/36* (2021.01)

(52) U.S. Cl.
CPC .............. *G03B 5/04* (2013.01); *G02B 27/646* (2013.01); *G03B 13/36* (2013.01); *G03B 2205/0015* (2013.01)

(58) Field of Classification Search
CPC .. G03B 5/04; G03B 13/36; G03B 2205/0015; G03B 3/10; G03B 2205/0007;
(Continued)

(56) References Cited

U.S. PATENT DOCUMENTS 10,715,730 B1 7/2020 Xu et al.
12,248,239 B2 * 3/2025 Park ....................... H04N 23/57
(Continued)

FOREIGN PATENT DOCUMENTS

CN 109413306 A 3/2019
CN 112394594 A 2/2021
(Continued)

OTHER PUBLICATIONS

Machine translation of CN217385933U retrieved electronically from PE2E Search Aug. 1, 2025 (Year: 2025).*
(Continued)

*Primary Examiner* — Cara E Rakowski
(74) *Attorney, Agent, or Firm* — NSIP Law

(57) ABSTRACT

A camera module include a first moving body, disposed in a housing, configured to move in an optical axis direction; a guide member having one surface disposed to oppose the first moving body, the guide member coupled to the first moving body and configured to move in a direction orthogonal to an optical axis; a second moving body disposed to oppose another surface of the guide member, the second moving body coupled to the guide member and configured to move in the direction orthogonal to the optical axis; a gel accommodating portion formed on one surface of surfaces of the first moving body, the second moving body, and the guide member opposing each other, the gel accommodating
(Continued)

portion configured to accommodate a damping gel; and a damping pin configured to protrude from a position oppose the gel accommodating portion, the damping pin having a portion insertable into the damping gel.

20 Claims, 10 Drawing Sheets

(58) Field of Classification Search
CPC .. G03B 2205/0069; G03B 17/12; G03B 5/00; G03B 17/02; G03B 30/00; G02B 27/646; F16F 15/02; F16F 2224/048
See application file for complete search history.

(56) References Cited

U.S. PATENT DOCUMENTS

| | | | |
|---|---|---|---|
| 2015/0296143 A1 | 10/2015 | Kang et al. | |
| 2015/0309282 A1 | 10/2015 | Lee et al. | |
| 2016/0070114 A1 | 3/2016 | Hubert et al. | |
| 2019/0058817 A1 | 2/2019 | Seo et al. | |
| 2021/0048730 A1 | 2/2021 | Jeong et al. | |
| 2022/0272237 A1* | 8/2022 | Rho | H04N 23/51 |
| 2023/0077193 A1* | 3/2023 | Park | G03B 30/00 |

FOREIGN PATENT DOCUMENTS

| | | | | |
|---|---|---|---|---|
| CN | 217385933 U * | 9/2022 | | G03B 30/00 |
| DE | 10 2014 204 523 A1 | 9/2015 | | |
| KR | 10-2015-0118008 A | 10/2015 | | |
| KR | 10-2015-0138034 A | 12/2015 | | |
| KR | 10-2016-0148281 A | 12/2016 | | |
| KR | 10-2021-0015401 A | 2/2021 | | |
| WO | WO 2015/135857 A1 | 9/2015 | | |

OTHER PUBLICATIONS

Korean Office Action issued on Sep. 12, 2023, in counterpart Korean Patent Application No. 10-2021-0175910 (7 pages in English, 5 pages in Korean).

Chinese Office Action Issued on Jul. 12, 2025, in Counterpart Chinese Patent Application No. 202211570934.X (6 Pages in English, 9 Pages in Chinese).

* cited by examiner

I–I'

CAMERA MODULE

CROSS-REFERENCE TO RELATED APPLICATION(S)

This application claims the benefit under 35 USC 119(a) of Korean Patent Application No. 10-2021-0175910 filed on Dec. 9, 2021, in the Korean Intellectual Property Office, the entire disclosure of which is incorporated herein by reference for all purposes.

BACKGROUND

1. Field

The following description relates to a camera module.

2. Description of Related Art

A camera employed in a mobile device such as a smartphone or a tablet may provide an optical image stabilization (OIS) function. The mobile device may compensate for the shaking of the mobile device by moving a lens or a sensor of the camera, thereby providing a clear image.

The lens or image sensor may tilt, linearly move, or rotate depending on OIS driving. However, when the lens is exposed to an external disturbance, such as an external shock during driving, the lens is not smoothly driven, which may degrade the OIS quality.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module include a first moving body, disposed in a housing, configured to move in an optical axis direction; a guide member having one surface disposed to oppose the first moving body, the guide member coupled to the first moving body and configured to move in a direction orthogonal to an optical axis; a second moving body disposed to oppose another surface of the guide member, the second moving body coupled to the guide member and configured to move in the direction orthogonal to the optical axis; a gel accommodating portion formed on one surface of surfaces of the first moving body, the second moving body, and the guide member opposing each other, the gel accommodating portion configured to accommodate a damping gel; and a damping pin configured to protrude from a position on the first moving body, the second moving body, or the guide member opposing the gel accommodating portion, the damping pin having a portion insertable into the damping gel.

The camera module may include a first gel accommodating portion formed on one surface of surfaces of the first moving body and the guide member opposing each other, and a first damping pin disposed at a position opposing the first gel accommodating portion; and a second gel accommodating portion formed on one surface of surfaces of the second moving body and the guide member opposing each other, and a second damping pin disposed at a position opposing the second gel accommodating portion.

The damping gel may include a viscoelastic material.

The damping pin may be integrally formed with any one or any two or more of the first moving body, the second moving body, and the guide member.

The damping pin may be coupled to any one or any two or more of the first moving body, the second moving body, and the guide member through insert injection.

The camera module may further include a post member configured to pass through and couple to the guide member. Either one or both opposite ends of the post member may protrude outside of the guide member as the damping pin.

The opposite ends of the post member may protrude outside of the guide member as a first damping pin and a second damping pin, respectively. The first moving body may include a first gel accommodating portion configured to receive the first damping pin, and the second moving body may include a second gel accommodating portion configured to receive the second damping pin.

The first gel accommodating portion may be formed on one surface of the guide member, and the second gel accommodating portion may be formed on another surface of the guide member. The first gel accommodating portion and the second gel accommodating portion may be spaced apart from each other by a predetermined distance in a surface direction of the guide member.

The gel accommodating portion may be a through-hole vertically passing through the guide member.

The camera module may include a first damping pin protruding from the first moving body, and a second damping pin protruding from the second moving body. The first damping pin and the second damping pin may be insertable into the through-hole.

The camera module may further include a driving portion configured to drive the first moving body relative to the housing in the optical axis direction.

The camera module may further include a driving portion configured to drive the second moving body relative to the first moving body in the direction orthogonal to the optical axis.

In another general aspect, a camera module includes a first moving body, disposed in a housing, configured to move in an optical axis direction; a second moving body, coupled to the first moving body, configured to move in a direction orthogonal to an optical axis; a ball member disposed between the first moving body and the second moving body; a damping gel disposed on one surface of surfaces of the first moving body and the second moving body opposing each other; and a damping pin configured to protrude from a position on the first moving body, the second moving body, or the guide member opposing the damping gel, the damping pin having a portion insertable into the damping gel.

The second moving body may be movable in a first direction and a second direction, orthogonal to the optical axis. The first direction and the second direction may be orthogonal to each other.

One of the first moving body and the second moving body may have a gel accommodating portion in which the damping gel is accommodated.

The damping gel may include a viscoelastic material.

In another general aspect, a camera module includes a first moving body, disposed in a housing, configured to move in an optical axis direction; a second moving body configured to move in a direction orthogonal to an optical axis; a guide member, disposed between the first moving body and the second moving body, coupled to the first moving body and the second moving body, coupled to the first moving body and configured to move in the direction orthogonal to the optical axis; a gel accommodating portion, formed on one of a lower surface of the first moving body and an upper surface of the guide member, configured to accommodate a damping gel; and a damping pin disposed on another of the lower surface of the first moving body and the upper surface of the guide member, wherein a portion of the damping pin is insertable into the damping gel.

In another general aspect, an electronic device includes a camera module. The camera module includes a lens holder, disposed in a housing, configured to move in an optical axis direction; a carrier configured to move in a direction parallel to the optical axis; a guide member, disposed between the lens holder and the carrier, coupled to the lens holder and configured to move in a direction orthogonal to the optical axis; a gel accommodating portion, disposed between either the guide member and the carrier or the guide member and the lens holder, the gel accommodating portion configured to accommodate a damping gel; and a damping pin disposed between either the guide member and the carrier or the guide member and the lens holder.

A portion of the damping pin may be insertable into the damping gel.

The gel accommodating portion may be disposed on a surface of the guide member, and the damping pin may be disposed on a surface of the carrier opposing the surface of the guide member.

Other features and aspects will be apparent from the following detailed description, the drawings, and the claims.

BRIEF DESCRIPTION OF DRAWINGS

Throughout the drawings and the detailed description, the same reference numerals refer to the same or like elements. The drawings may not be to scale, and the relative size, proportions, and depiction of elements in the drawings may be exaggerated for clarity, illustration, and convenience.

DETAILED DESCRIPTION

Figure 1:
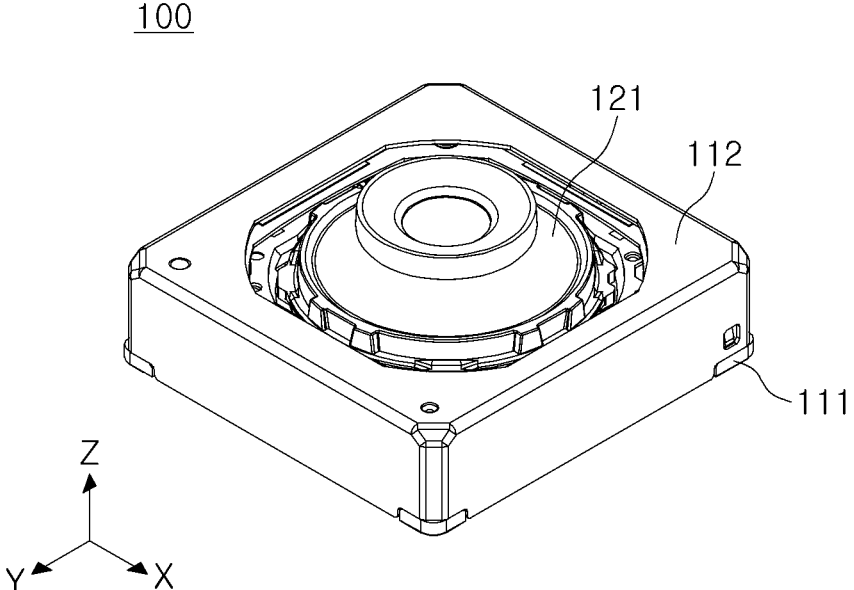
FIG. 1 is a perspective view of a camera module according to an example embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

As used herein, an X-direction, a Y-direction, and a Z-direction refer to a direction, parallel to an X-axis, a direction, parallel to a Y-axis, and a direction, parallel to a Z-axis illustrated in the drawings, respectively. In addition, unless otherwise described, the X-direction is based on a concept including both a +X-axis direction and a –X-axis direction, which is also applied to the Y-direction and the Z-direction.

As used herein, two directions (or axes) parallel to or orthogonal to each other includes two directions (or axes) are substantially parallel to each other. For example, a first axis and a second axis orthogonal to each other refer to a first axis and a second axis forming an angle of 90 degrees or an angle close to 90 degrees.

As used herein, paragraphs beginning with "in an example embodiment" do not necessarily refer to the same example embodiments. The particular features, structures, or characteristics may be combined in any suitable manner consistent with the present disclosure.

An aspect of the present disclosure provides a camera module implementing high-quality OIS in preparation for a high-frequency external disturbance acting on the camera module or a lens in a camera.

Figure 2:
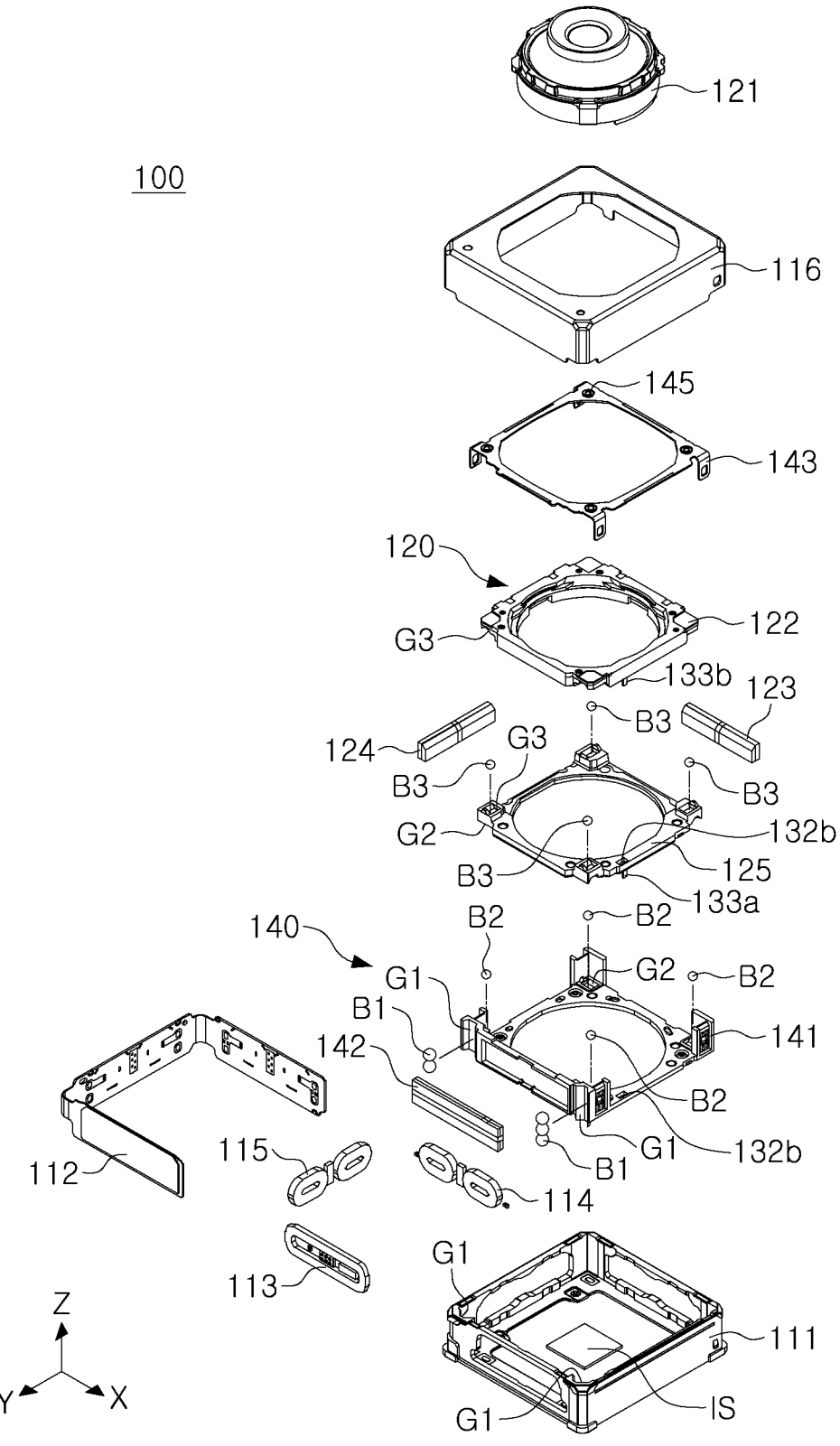
FIG. 2 is an exploded perspective view of the camera module illustrated in FIG. 1.
Figure 3:
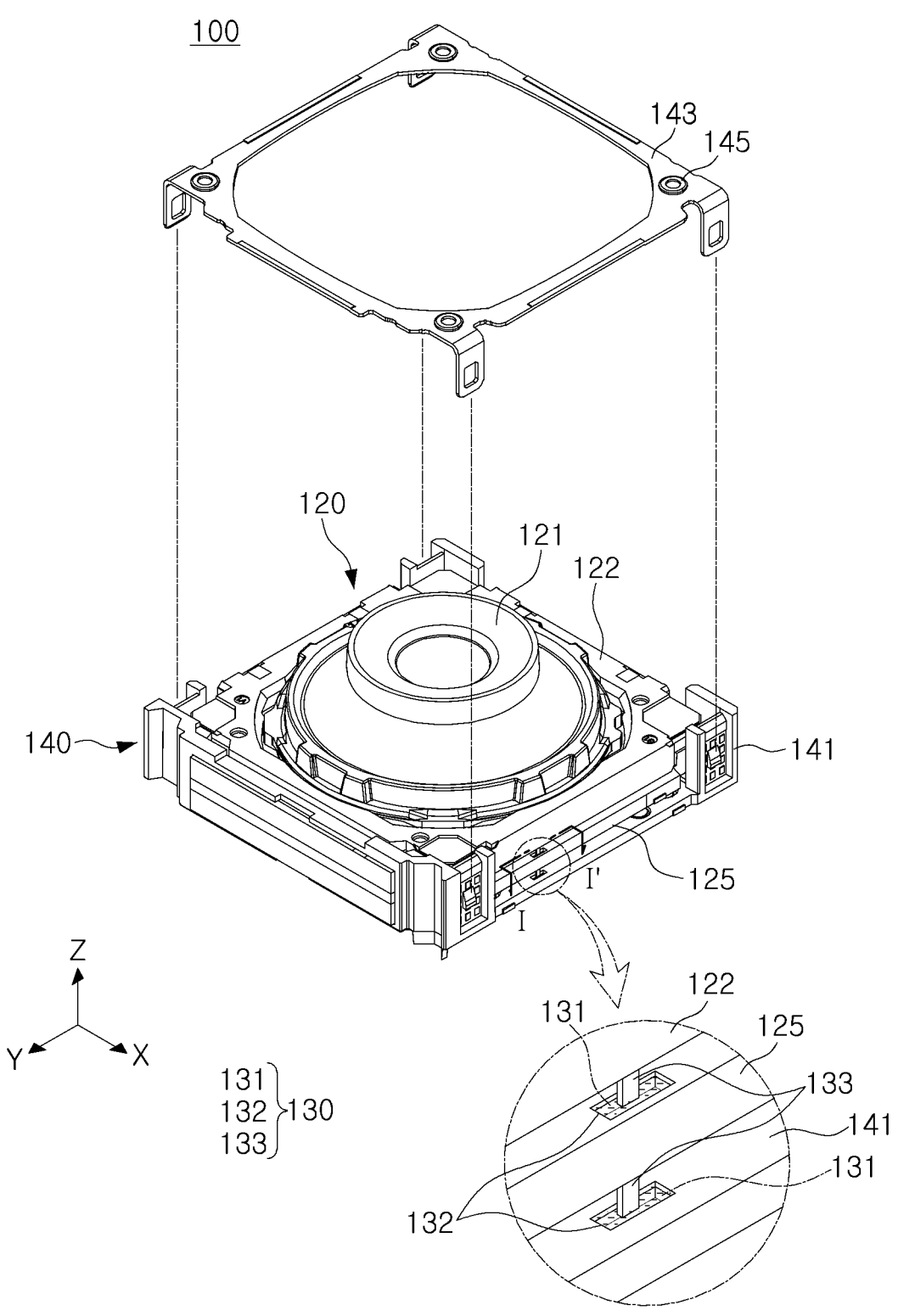
FIG. 3 is a perspective view in which a carrier and a cover are separated from the camera module illustrated in FIG. 1.
Figure 4:
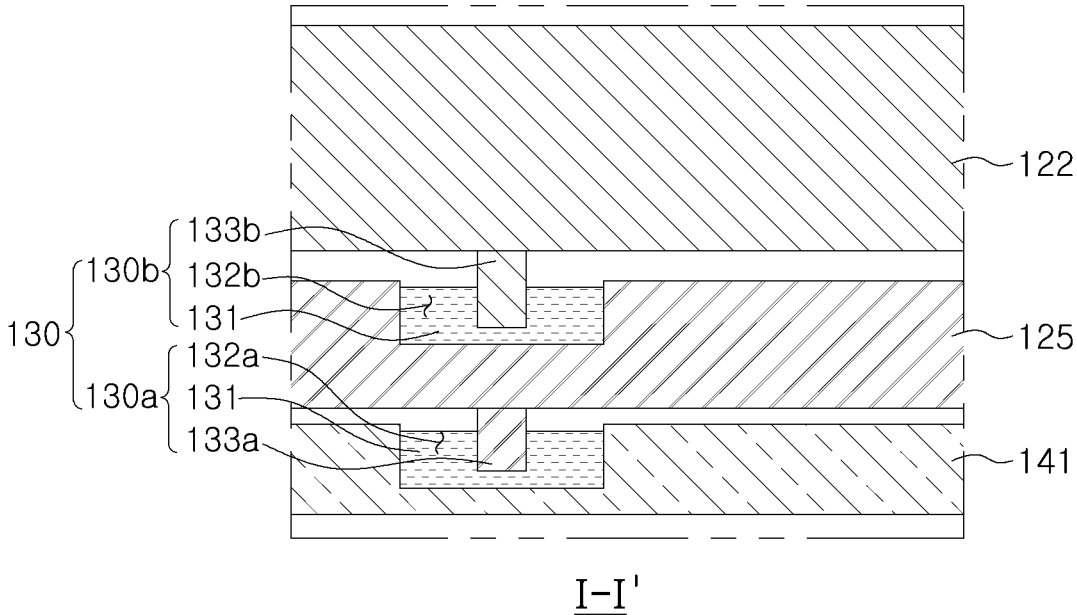
FIG. 4 is a cross-sectional view taken along line I-I' of FIG. 3.

FIG. 1 is a perspective view of a camera module according to an example embodiment of the present disclosure. FIG. 2 is an exploded perspective view of the camera module illustrated in FIG. 2. FIG. 3 is a perspective view in which a carrier and a cover are separated from the camera module illustrated in FIG. 1. FIG. 4 is a cross-sectional view taken along line I-I' of FIG. 3.

Referring to FIGS. 1 to 4, a camera module 100, according to one or more embodiments, may include a housing 111, a lens barrel 121 accommodated in the housing 111, and an image sensor IS disposed on a lower portion of the lens barrel 121. A lens may include at least one lens element defining an optical axis. In the present disclosure, the optical axis may be parallel to a Z-axis.

The camera module 100 may provide an automatic focus control or optical image stabilization function by driving the lens barrel 121, including a lens. To this end, the camera module 100 may include a driving portion configured to allow the lens barrel 121 to move with respect to the housing 111. For example, the driving portion may allow the lens barrel 121 to move along the optical axis or in a direction, orthogonal to the optical axis.

The focus of a captured image may be adjusted as the lens barrel 121 moves in a direction parallel to the optical axis. In addition, as the lens barrel 121 moves in a direction orthogonal to the optical axis or tilts with respect to the optical axis, the camera's shaking may be mitigated.

The lens barrel 121 may be accommodated in a carrier 141 to move in an optical axis direction, together with the carrier 141. The carrier 141 may be configured to be movable with respect to the housing 111 in a direction, parallel to the optical axis. To this end, the camera module 100 may include a first driving portion allowing the carrier 141 to move in the optical axis direction. The first driving portion may include a voice coil motor.

A first magnet 142 may be mounted on one side of the carrier 141, and a first coil 113 opposing the first magnet 142 may be disposed in the housing 111. The carrier 141 (or the lens barrel 121) may move with respect to the housing 111 in a direction parallel to the optical axis by electromagnetic interaction between the first magnet 142 and the first coil 113. The first coil 113 may be attached to a substrate 112 disposed on a side surface of the housing 111. In another example embodiment, the first magnet 142 may be mounted on the housing 111, and the first coil 113 may be mounted on the carrier 141.

The first driving portion may include a first guide structure configured to guide the movement of the carrier 141 in the optical axis direction. For example, the first guide structure may include a first ball member B1 and a first guide groove G1 accommodating the first ball member B1. The first guide groove G1 may extend in a direction parallel to the optical axis and may be provided in the carrier 141 and the housing 111, respectively. In one or more embodiments, the first magnet 142 may be mounted on one side of the carrier 141, and the first guide groove G1 may be respectively disposed on opposite sides of the first magnet 142 in a longitudinal direction (that is, an X-direction) of the first magnet 142.

The first ball member B1 may move along the first guide groove G1 provided in the carrier 141 and the housing 111 in a direction parallel to the optical axis, and accordingly, a degree of freedom (DOF) of the carrier 141 with respect to the housing 111 may be limited in a direction, parallel to the optical axis.

The first ball member B1 may move in a state of being in close contact with the first guide groove G1 provided in the carrier 141 and the housing 111, and the state may be maintained by a pulling magnet and a pulling yoke. For example, a pulling yoke opposing the first magnet 142 may be disposed on one side of the first coil 113, and the first magnet 142 may function as a pulling magnet. The magnetic attraction between the pulling yoke and the pulling magnet may pull the carrier 141 to one side of the housing 111, and accordingly, the first ball member B1 may be in close contact with the first guide grooves G1 on opposite sides thereof. However, when a plurality of first ball members B1 exist, some of the plurality of first ball members B1 may be in close contact with the first guide groove G1, and an air gap may exist between the other first ball members B1 and the first guide groove G1.

The lens barrel 121 may be configured to move with respect to the housing 111 in two directions, orthogonal to the optical axis. For example, the lens barrel 121 may move with respect to the housing 111 in a first direction, orthogonal to the optical axis or in a second direction, orthogonal to the optical axis. The first direction (X-axis direction) and the second direction (Y-axis direction) may be different directions, and may be orthogonal to each other. For example, the first direction may be an X-axis direction, and the second direction may be a Y-axis direction. In addition, the lens barrel 121 may be configured to move with respect to the carrier 141 in a direction orthogonal to the optical axis. Movement of the lens barrel 121 in a direction parallel to the optical axis may be provided by movement of the carrier 141 with respect to the housing 111, and movement of the lens barrel 121 in a direction orthogonal to the optical axis may be provided by movement of the lens barrel 121 with respect to the carrier 141.

The lens barrel 121 may be fixedly coupled to the lens holder 122. In the illustrated example embodiment, the lens barrel 121 and the lens holder 122 are provided as separate components, but this is an example. In an example embodiment, the lens barrel 121 and the lens holder 122 may be provided integrally with each other.

The camera module 100 may include a second driving portion configured to allow the lens barrel 121 (or the lens holder 122) to move with respect to the carrier 141 (or the housing 111) in a direction orthogonal to the optical axis.

The second driving portion may include a second magnet 123 and a third magnet 124 fixedly coupled to the lens holder 122. In addition, the second driving portion may include a second coil 114 and a third coil 115 opposing the second magnet 123 and the third magnet 124, respectively, and the second coil 114 and the third coil 115 fixedly coupled to the housing 111. Electromagnetic interaction between the second magnet 123 and the second coil 114 or electromagnetic interaction between the third magnet 124 and the third coil 115 may allow the lens barrel 121 to move (or the housing 111) with respect to the carrier 141 in a direction, orthogonal to the optical axis. For example, due to the interaction between the second coil 114 and the second magnet 123, the lens holder 122 may move in the carrier 141 in the first direction or the second direction.

The second coil 114 and the third coil 115 may be attached to the substrate 112 disposed on the side surface of the housing 111. In another example embodiment, the second magnet 123 and/or the third magnet 124 may be mounted on the housing 111, and the second coil 114 and/or the third coil 115 may be mounted on the lens holder 122.

In addition, the camera module 100, according to one or more embodiments, may include a guide member 125 disposed between the lens holder 122 and the carrier 141. A second ball member B2 may be disposed between the carrier 141 and the guide member 125, and a third ball member B3 may be disposed between the guide member 125 and the lens holder 122.

Each of the carrier 141 and the guide member 125 may include a second guide groove G2 accommodating at least a portion of the second ball member B2. In addition, each of the guide member 125 and the lens holder 122 may include a third guide groove G3 accommodating at least a portion of the third ball member B3. The second guide groove G2 or the third guide groove G3 may extend in a direction, orthogonal to the optical axis, and may accommodate at least a portion of the second ball member B2 or the third ball member B3.

For example, the second guide groove G2 may be elongated in the first direction, and the second ball member B2 may move along the second guide groove G2 in the first direction. In addition, the third guide groove G3 may be elongated in the second direction, and the third ball member B3 may move along the third guide groove G3 in the second direction. In this case, the movement of guide member 125 with respect to the carrier 141 may be limited in the first direction, and the movement of the lens holder 122 with respect to the guide member 125 may be limited in the second direction.

The second ball member B2 and the third ball member B3 may move in close contact with the second guide groove G2 or the third guide groove G3, and the state may be maintained by a pulling magnet and a pulling yoke. For example, the pulling yoke may be disposed on a portion of the carrier 141 opposing the second magnet 123 or the third magnet 124 in the optical axis direction, and the second magnet 123 or the third magnet 124 may function as the pulling magnet.

The magnetic attraction between the pulling yoke and the pulling magnet may pull the lens holder 122 toward the carrier 141, and accordingly, the second ball member B2 or the third ball member B3 may be in close contact with the second guide grooves G2 or the third guide groove G3 on opposite sides thereof.

However, when there are a plurality of the second ball members B2 or the third ball members B3, only some of the plurality of the second ball members B2 or the third ball members B3 may be in close contact with the second guide groove G2 or the third guide groove G3. For another example, when four second ball members B2 are disposed between the guide member 125 and the carrier 141, three ball members may be in close contact with the second guide groove G2, and the remaining one ball member may not be in close contact with the second guide groove G2. For another example, when four third ball members B3 are disposed between the guide member 125 and the lens holder 122, three ball members may be in close contact with the third guide groove G3, and the remaining one ball member may not be in close contact with the third guide groove G3.

The camera module 100 may include a cover 143 fixedly coupled to the carrier 141. In an example embodiment, the cover 143 may be configured to prevent the lens holder 122 from being separated from the carrier 141. The cover 143 may be partially disposed on the lens holder 122. The cover 143 may be configured to at least partially cover the lens holder 122. For example, a portion of the cover 143 may be configured to overlap the lens holder 122 in the optical axis direction. The lens holder 122 may partially move in the carrier 141 in the optical axis direction. However, lens holder 122 may be blocked by the cover 143, and thus may not be separated from the carrier 141.

The camera module 100 may include a shield can 116 fixedly coupled to the housing 111. The shield can 116 may cover an upper portion of the housing 111 to protect components (for example, the carrier 141 and the lens holder 122) in the housing 111. The shield can 116 may be configured to prevent or minimize the penetration of an external magnetic field of the camera module 100 into the camera module 100. In addition, the shield can 116 may minimize or prevent a magnetic field generated in the camera module 100 from leaking to the outside of the camera module 100 and affecting other devices.

The carrier 141 may move in the housing 111 in the optical axis direction, and the carrier 141 may collide with the shield can 116. Therefore, a damper 145 may be mounted on the cover 143 to mitigate the impact between the shield can 116 and the carrier 141. The damper 145 may be formed of a material that is elastically deformable by an external force, and may be deformed when colliding with the shield can 116, thereby absorbing impact or reducing impact force. For example, the damper 145 may be formed of a material such as rubber, urethane, or silicone.

The damper 145 may be configured to partially protrude upwardly (+Z direction) of the cover 143, thereby mitigating impact or noise generated when the carrier 141 moves in a +Z direction and collides with the shield can 116.

Hereinafter, components disposed to be movable in the optical axis direction within the housing 111 will be referred to as a first moving body 140. The first moving body 140 may include a carrier 141 and a component fixedly coupled to the carrier 141. For example, the first moving body 140 may include the carrier 141, the cover 143 fixedly coupled to the carrier 141, and the damper 145.

In addition, components coupled to be movable with respect to the carrier 141 in a direction orthogonal to the optical axis are referred to as a second moving body 120. The second moving body 120 may include the lens holder 122 and a component fixedly coupled to the lens holder 122. For example, the second moving body 120 may include the lens barrel 121 and the lens holder 122 fixedly coupled to the lens barrel 121.

In addition, the guide member 125 may be disposed between the first moving body 140 and the second moving body 120 to connect the first moving body 140 and the second moving body 120 to each other such that the first moving body 140 and the second moving body 120 are mutually movable. For example, the first moving body 140 may be disposed to oppose one surface of the guide member 125 and may be coupled to the guide member 125 via the second ball member B2, and the second moving body 120 may be disposed to oppose the other surface of the guide member 125 and may be coupled to the guide member 125 via the third ball member B3.

In the camera module 100 configured above, an OIS function may be implemented as the lens holder 122 moves with respect to the carrier 141 in a direction orthogonal to the optical axis. However, the movement of the lens holder 122 may not be smooth due to an external disturbance. The external disturbance may originate outside the camera module 100 or be generated by an operation of the second driving portion (that is, an OIS driving portion). Accordingly, the camera module 100, according to one or more embodiments, may include a damper structure 130 so as to minimize impact caused by the external disturbance.

The damper structure 130 may dampen unnecessary vibrations generated in a lens barrel due to the external disturbance. Referring to FIGS. 3 and 4, the damper structure 130 may be provided on two members coupled to each other by a ball member, and may include a gel accommodating portion 132 filled with a damping gel 131 and a damping pin 133 inserted into the damping gel 131.

The gel accommodating portion 132 may be formed in a member (hereinafter, referred to as a first member) among the first moving body 140, the second moving body 120, and the guide member 125, and may be formed on one of the surfaces on which the first moving body 140, the second moving body 120, and the guide member 125 oppose each other. Specifically, the gel accommodating portion 132 may be formed in any one or any combination of any two or more of the carrier 141, the lens holder 122, and the guide member 125.

The gel accommodating portion 132 may be formed as a groove, and the damping gel 131 may be filled in the gel accommodating portion 132. The damping gel 131 may include a viscoelastic material. In one or more embodiments, the viscoelastic material may include gel, grease, or the like, and viscosity may be controlled through UV or heat.

The damping pin 133 may be formed on a member (hereinafter, referred to as a second member) disposed to oppose the first member among the first moving body 140, the second moving body 120, and the guide member 125, and may be formed at a position of the second member opposing the gel accommodating portion 132.

The damping pin 133 may protrude from the second member by a predetermined distance in the form of a rod or a pin, such that at least a portion thereof may be inserted into the damping gel 131 contained in the gel accommodating portion 132. In this case, an end of the damping pin 133 may be disposed to be spaced apart from a bottom surface of the gel accommodating portion 132 by a predetermined distance.

When the damping pin 133 is formed through injection molding, the damping pin 133 may be formed integrally with the second member to which the damping pin 133 is coupled. In this case, the damping pin 133 may be formed of a material the same as that of the second member. However, when the damping pin 133 is coupled to the second member through an insert injection process, the damping pin 133 may be formed of a material different from that of the second member.

When the gel accommodating portion 132 is provided in the guide member 125, the damping pin 133 may be provided on the lens holder 122 or the carrier 141. Conversely, when the gel accommodating portion 132 is provided in the lens holder 122 or the carrier 141, the damping pin 133 may be provided on the guide member 125.

While the lens holder 122 or the guide member 125 moves, the damping pin 133 may not need to come into contact with a side surface of the gel accommodating portion 132, such that the gel accommodating portion 132 may be formed to have a wider area than an area in which the damping pin 133 is movable. Accordingly, when the second moving body 120 or the guide member 125 moves in a direction orthogonal to the optical axis, the damping pin 133 may be maintained in a state of being spaced apart from the side and bottom surfaces of the gel accommodating portion 132.

In one or more embodiments, the damper structure 130 may include a first damper structure 130*a* and a second damper structure 130*b*.

The first damper structure 130*a* may be provided to mitigate impacts caused by external disturbances in mutual movement between the first moving body 140 and the guide member 125. In one or more embodiments, the first damper structure 130*a* may include a first damping pin 133*a* provided on one of the carrier 141 and the guide member 125 opposing each other, and a first gel accommodating portion 132*a* provided in the other one of the carrier 141 and the guide member 125.

Figure 6:
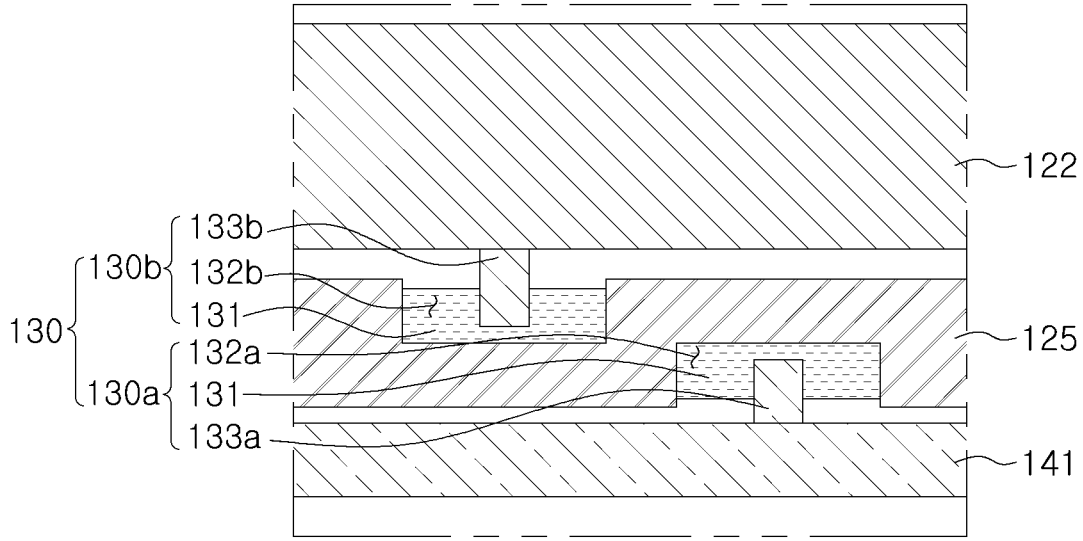
FIG. 6 is a partial cross-sectional view of a camera module according to another example embodiment of the present disclosure.

In one or more embodiments, the first gel accommodating portion 132*a* may be formed in the carrier 141, and the first damping pin 133*a* may be formed at a position of the guide member 125 opposing a second gel accommodating portion 132*b*. However, as illustrated in FIG. 6, it may also be possible to form the first gel accommodating portion 132*a* in the guide member 125 and to form the first damping pin 133*a* on the carrier 141 opposing the first gel accommodating portion 132*a*.

The first damping pin 133*a* may be formed integrally with the guide member 125. For example, in a process of performing injection molding on the guide member 125, the first damping pin 133*a* may be formed together with the guide member 125. In this case, the first damping pin 133*a* may be formed of a material similar to the guide member 125. However, when the insert injection process is used, the first damping pin 133*a* may be formed of a material different from that of the guide member 125 to be coupled to the guide member 125.

The present disclosure is not limited to the above configuration, and it is also possible to separately manufacture the first damping pin 133*a*, and then to couple the first damping pin 133*a* to the lens holder 122.

Such a configuration may be equally applied to a case where the first damping pin 133*a* is formed on the carrier 141. For example, the first damping pin 133*a* may be formed integrally with the carrier 141 or may be separately manufactured and then coupled to the carrier 141. In addition, the first damping pin 133*a* may be formed of a material the same as or different from that of the carrier 141.

The second damper structure 130*b* may be provided to mitigate the impact caused by an external disturbance in movement between the second moving body 120 and the guide member 125. In one or more embodiments, the second damper structure 130*b* may include a second damping pin 133*b* provided on one of the lens holder 122 and the guide member 125 opposing each other, and a second gel accommodating portion 132*b* provided in the other one of the lens holder 122 and the guide member 125.

Figure 5:
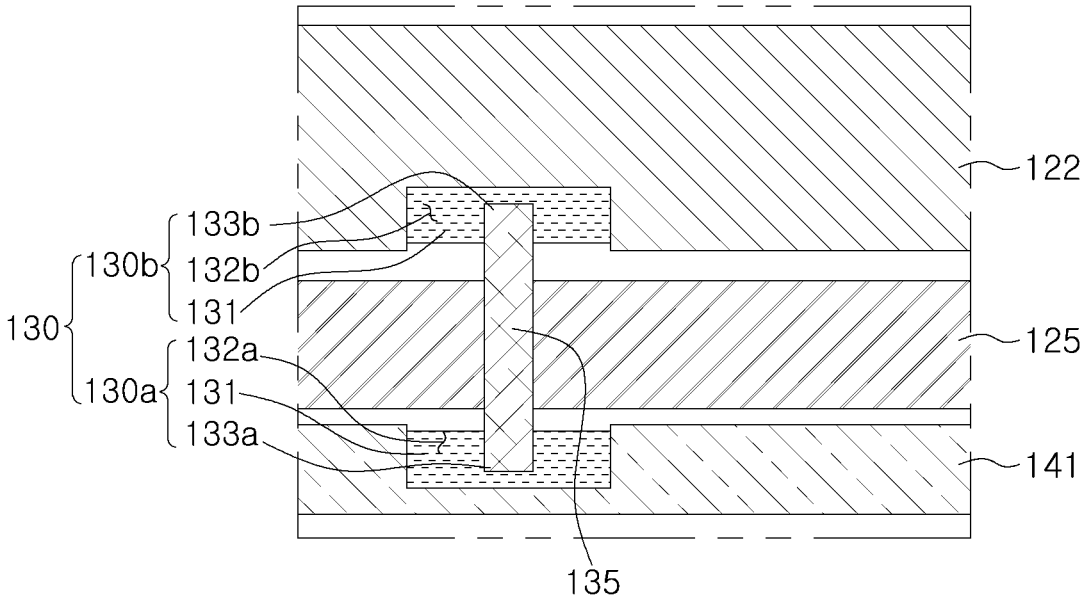
FIG. 5 is a partial cross-sectional view of a camera module according to another example embodiment of the present disclosure.

In one or more embodiments, the second gel accommodating portion 132*b* may be formed in the guide member 125, and the second damping pin 133*b* may be formed at a position of the lens holder 122 opposing the second gel accommodating portion 132*b*. However, as illustrated in FIG. 5, it is also possible to form the second gel accommodating portion 132*b* in the lens holder 122, and to form the second damping pin 133*b* on the guide member 125 opposing the second gel accommodating portion 132*b*.

The second damping pin 133*b* may be formed integrally with the lens holder 122. For example, in a process of performing injection molding on the lens holder 122, the second damping pin 133*b* may be formed together with the lens holder 122. In this case, the second damping pin 133*b* may be formed of a material similar to the lens holder 122. However, when the insert injection process is used, the second damping pin 133*b* may be formed of a material different from that of the lens holder 122 to be coupled to the lens holder 122.

The present disclosure is not limited to the above configuration, and it is also possible to separately manufacture the second damping pin 133*b*, and then to couple the second damping pin 133*b* to the lens holder 122.

Such a configuration may be equally applied to a case in which the second damping pin 133*b* is formed on the guide member 125. For example, the second damping pin 133*b* may be formed integrally with the guide member 125 or may be separately manufactured and then coupled to the guide member 125. In addition, the second damping pin 133*b* may be formed of a material similar to or different from the guide member 125.

When the second moving body 120 moves in a direction orthogonal to the optical axis, the camera module 100 configured as described above according to one or more embodiments may move while being maintained in a state in which a portion of the damping pin 133 is inserted into the damping gel 131. Accordingly, unnecessary vibrations generated while the second moving body 120 moves in a direction orthogonal to the optical axis may be damped by coupling the damping pin 133 and the damping gel 131.

In addition, the camera module 100, according to one or more embodiments, may include a first damper structure 130*a* for damping vibrations between the lens holder 122 and the guide member 125, and a second damper structure 130*b* for damping vibrations between the carrier 141 and the guide member 125. Accordingly, unnecessary vibrations generated due to the movement of the guide member 125 and unnecessary vibrations generated due to the movement of the lens holder 122 may be minimized.

FIG. 5, a partial cross-sectional view of a camera module according to another example embodiment of the present disclosure, illustrates a cross-section corresponding line I-I' of FIG. 3.

Referring to FIG. 5, the damping pin 133 of one or more embodiments may be formed by coupling the post member 135 to the guide member 125 through an insert injection method. Accordingly, the first damping pin 133 may be formed of a material different from that of the guide member 125.

The post member 135 may be formed to have a bar shape, and at least one of opposite ends of the post member 135 may protrude to the outside of the guide member 125 to function as the damping pin 133.

In one or more embodiments, the post member 135 may pass through the guide member 125 and may be coupled to the guide member 125, and accordingly, both of the opposite ends of the post member 135 may protrude to the outside of the guide member 125. In this case, the opposite ends of the post member 135 may function as the first damping pin 133*a* and the second damping pin 133*b*, respectively.

Accordingly, in the damper structure 130, according to one or more embodiments, the first gel accommodating portion 132*a* into which the first damping pin 133*a* is inserted may be formed in the carrier 141 opposing the first damping pin 133*a*, and the second gel accommodating portion 132*b* into which the second damping pin 133*b* is inserted may be formed in the lens holder 122 opposing the second damping pin 133*b*.

In one or more embodiments, the post member 135 may be formed as a linear member. In this case, all of the post member 135, the first gel accommodating portion 132*a*, and the second gel accommodating portion 132*b* may be disposed on a straight line. However, the present disclosure is not limited thereto, and various modifications may be made, such as configuring the post member 135 to be bent at least once such that the opposite ends thereof are disposed on different straight lines.

FIG. 6, a partial cross-sectional view of a camera module according to another example embodiment of the present disclosure, illustrates a cross-section corresponding to line I-I' of FIG. 3.

Referring to FIG. 6, in the damper structure 130, according to one or more embodiments, both the first gel accommodating portion 132*a* and the second gel accommodating portion 132*b* may be formed in the guide member 125. Specifically, the first gel accommodating portion 132*a* may be formed on one surface of the guide member 125, and the second gel accommodating portion 132*b* may be formed on the other surface of the guide member 125, which is an opposite surface of the one surface. Accordingly, the first damping pin 133*a* may be disposed on the carrier 141, and the second damping pin 133*b* may be disposed on the lens holder 122.

When the first gel accommodating portion 132*a* and the second gel accommodating portion 132*b* are disposed on the same vertical line (with respect to the guide member 125), mutual interference between the first gel accommodating portion 132*a* and the second gel accommodating portion 132*b* may occur. Accordingly, in one or more embodiments, the first gel accommodating portion 132*a* and the second gel accommodating portion 132*b* may be disposed to be spaced apart from each other by a predetermined distance in a surface direction of the guide member 125. Accordingly, the first damping pin 133*a* and the second damping pin 133*b*, according to one or more embodiments, may be disposed on different vertical lines.

Figure 7:
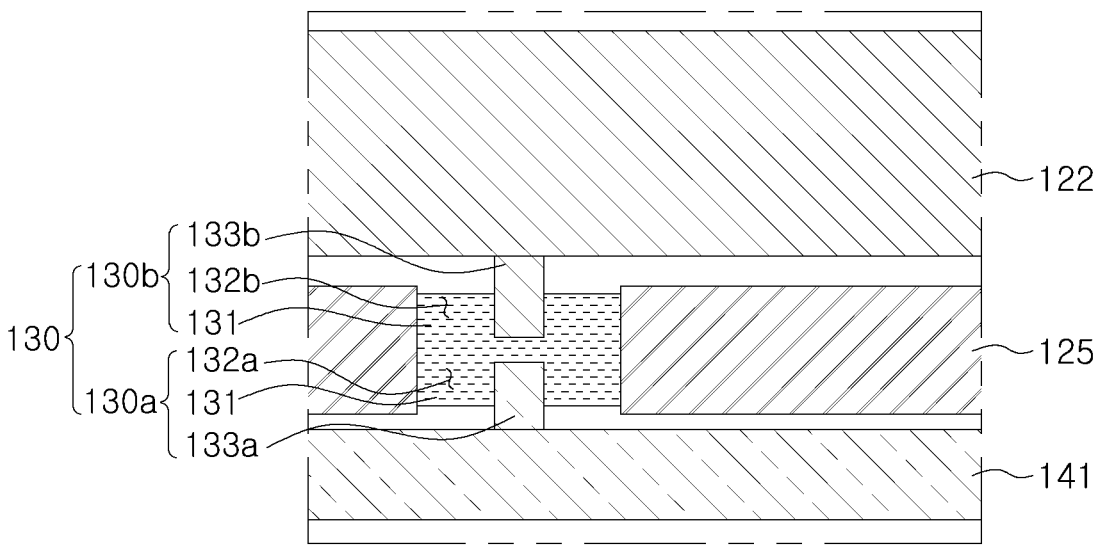
FIG. 7 is a partial cross-sectional view of a camera module according to another example embodiment of the present disclosure.

FIG. 7, a partial cross-sectional view of a camera module according to another example embodiment of the present disclosure, illustrates a cross-section corresponding to line I-I' of FIG. 3.

Referring to FIG. 7, in the damper structure 130 of one or more embodiments, the first gel accommodating portion 132*a* and the second gel accommodating portion 132*b* may be connected to each other. Both the first gel accommodating portion 132*a* and the second gel accommodating portion 132*b* may be formed in the guide member 125 and may be formed in the form of a through-hole vertically passing through the guide member 125. Accordingly, the damping gel 131 may be filled in the through-hole by filling the inside.

Accordingly, both an end of the first damping pin 133*a* disposed on the carrier 141 and an end of the second damping pin 133*b* disposed on the lens holder 122 may be accommodated in the through-hole.

When the first damping pin 133*a* and the second damping pin 133*b* are excessively elongated, the first damping pin 133 and the second damping pin 133 may be in contact with each other in the gel accommodating portion 132 while a second moving portion moves. Accordingly, the first damping pin 133*a* and the second damping pin 133*b*, according to one or more embodiments, may be formed to respectively have lengths that are not in contact with each other in the through-hole.

Accordingly, the first damping pin 133*a* and the second damping pin 133*b*, according to one or more embodiments, may be formed to respectively have lengths that are not in contact with each other in the through-hole.

Figure 8:
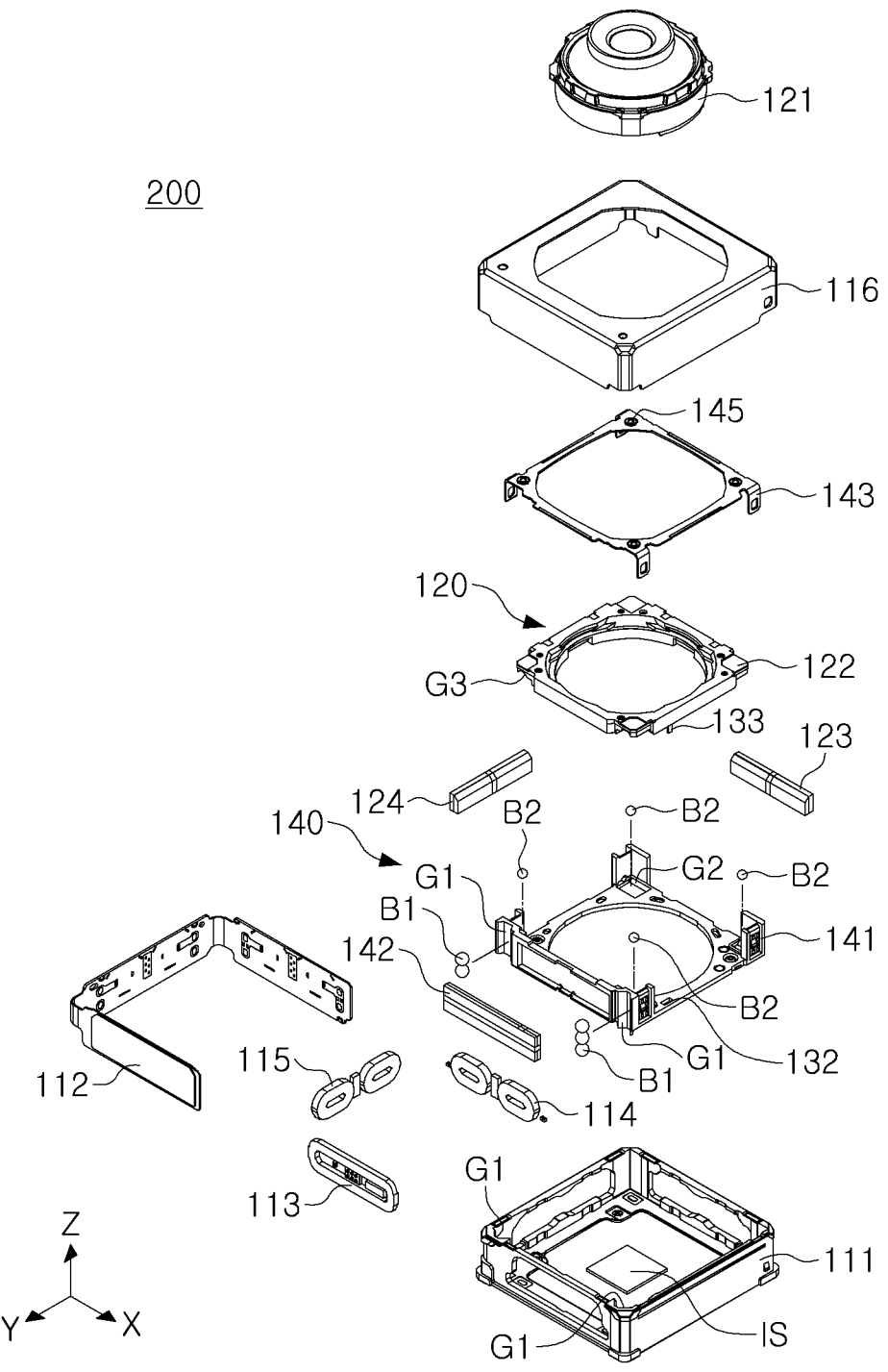
FIG. 8 is an exploded perspective view of a camera module according to another embodiment of the present disclosure.
Figure 9:
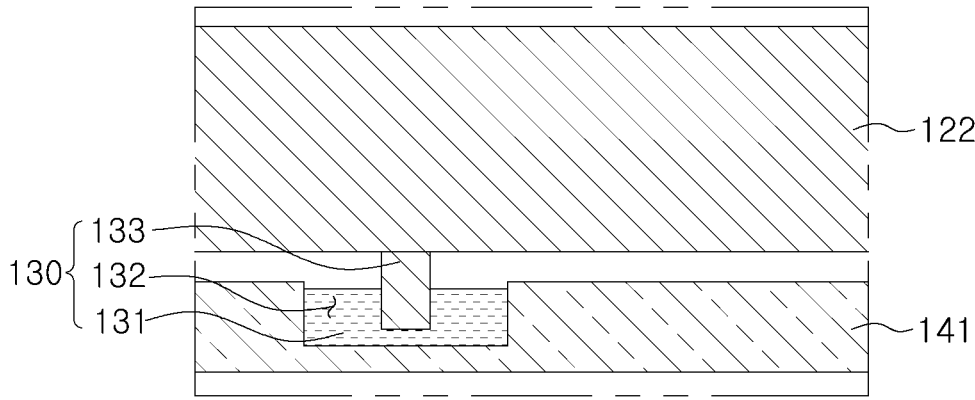
FIG. 9 is a partial cross-sectional view of FIG. 8.

FIG. 8 is an exploded perspective view of a camera module according to another example embodiment of the present disclosure. FIG. 9 is a partial cross-sectional view of FIG. 8, illustrating a cross-section corresponding to line I-I' of FIG. 3.

Referring to FIGS. 8 and 9, in a camera module 200 of one or more embodiments, the guide member 125 may be omitted from the above-described camera module (100 of FIG. 2). Accordingly, the third ball member B3 connecting the guide member 125 and the lens holder 122 to each other may also be omitted, and the second ball member B2 may be directly coupled to the lens holder 122.

In this case, the lens holder 122, the second moving body 120, may need to be coupled to the carrier 141 to move with respect to the carrier 141, the first moving body 140, in both a first direction and a second direction, orthogonal to an optical axis. Accordingly, the second guide groove G2 to which the second ball member B2 is coupled may be formed to have a shape and size in which the second ball member B2 is movable in the first and second directions.

In addition, in the damper structure 130, according to one or more embodiments, the damping gel 131 may be disposed on one of the surfaces on which the first moving body 140 and the second moving body 120 oppose each other, and the damping pin 133 may be disposed to protrude from a position opposing the damping gel 131.

For example, as illustrated in FIG. 9, when the gel accommodating portion 132 is provided in the carrier 141 that is the first moving body 140, the damping pin 133 may be formed at a position of the lens holder 122 opposing the gel accommodating portion 132, which is the second moving body 120, and a portion of the damping pin 133 may be inserted into the damping gel 131. Conversely, when the gel accommodating portion 132 is provided in the lens holder 122, the damping pin 133 may be formed on the carrier 141 to be inserted into the damping gel 131.

Figure 10:
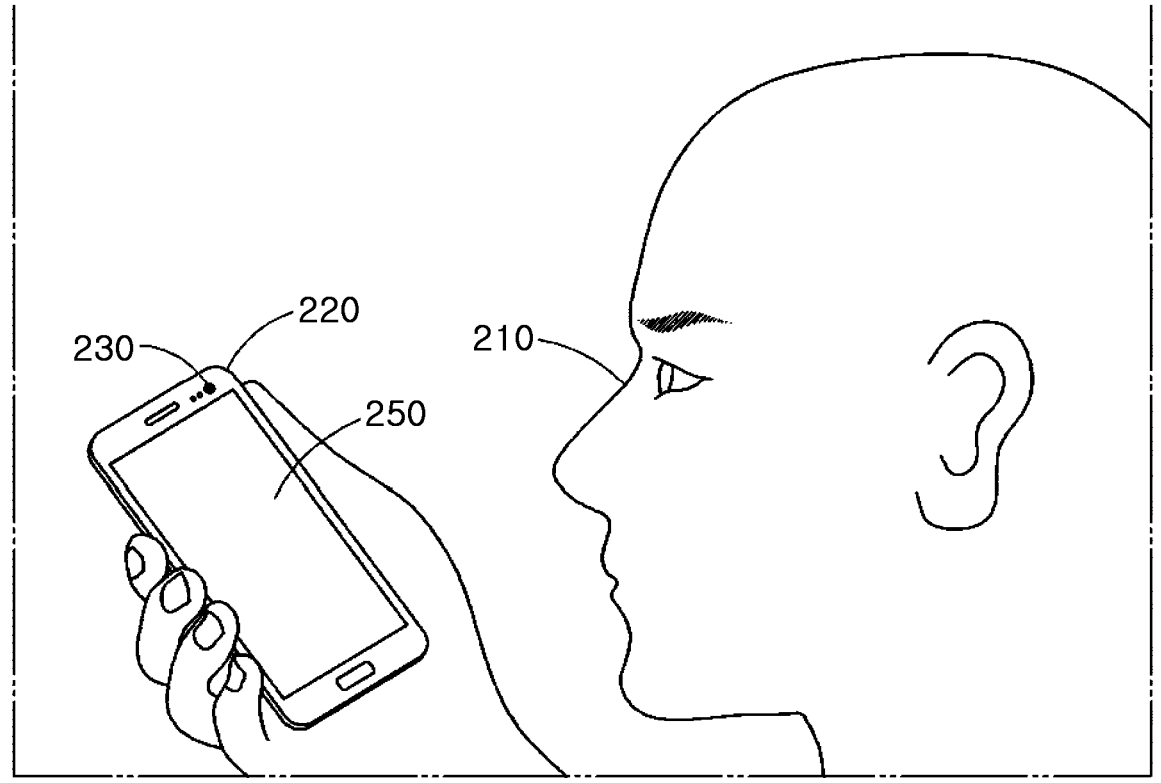
FIG. 10 illustrates an example of an electronic device comprising a camera module.

FIG. 10 illustrates an example of an electronic device comprising a camera module, e.g., as an example smartphone, and a user 210 using the smartphone 220, microphone 230, and display 250.

As such, a damper structure, according to the present disclosure, may be provided between two members moving while opposing each other to damp vibrations caused by movement.

As a non-exhaustive example only, an electronic device as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device configured to perform wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
   a first moving body, disposed in a housing, configured to move in an optical axis direction;
   a guide member having one surface disposed to oppose the first moving body, the guide member coupled to the first moving body and configured to move in a direction orthogonal to an optical axis;
   a second moving body disposed to oppose another surface of the guide member, the second moving body coupled to the guide member and configured to move in the direction orthogonal to the optical axis;
   a gel accommodating portion formed on one surface of surfaces of the first moving body, the second moving body, and the guide member opposing each other, the gel accommodating portion configured to accommodate a damping gel; and
   a damping pin configured to protrude from a position on the first moving body, the second moving body, or the guide member opposing the gel accommodating portion, the damping pin having a portion insertable into the damping gel.

2. The camera module of claim 1, comprising:

a first gel accommodating portion formed on one surface of surfaces of the first moving body and the guide member opposing each other, and a first damping pin disposed at a position opposing the first gel accommodating portion; and a second gel accommodating portion formed on one surface of surfaces of the second moving body and the guide member opposing each other, and a second damping pin disposed at a position opposing the second gel accommodating portion.

3. The camera module of claim 2, wherein the first gel accommodating portion is formed on one surface of the guide member, and the second gel accommodating portion is formed on another surface of the guide member, and the first gel accommodating portion and the second gel accommodating portion are spaced apart from each other by a predetermined distance in a surface direction of the guide member.

4. The camera module of claim 1, wherein the damping gel comprises a viscoelastic material.

5. The camera module of claim 1, wherein the damping pin is integrally formed with any one or any two or more of the first moving body, the second moving body, and the guide member.

6. The camera module of claim 1, wherein the damping pin is coupled to any one or any two or more of the first moving body, the second moving body, and the guide member through insert injection.

7. The camera module of claim 1, further comprising:

a post member configured to pass through and couple to the guide member, wherein either one or both opposite ends of the post member protrudes outside of the guide member as the damping pin.

8. The camera module of claim 7, wherein the opposite ends of the post member protrude outside of the guide member as a first damping pin and a second damping pin, respectively, and the first moving body comprises a first gel accommodating portion configured to receive the first damping pin, and the second moving body comprises a second gel accommodating portion configured to receive the second damping pin.

9. The camera module of claim 1, wherein the gel accommodating portion is a through-hole vertically passing through the guide member.

10. The camera module of claim 9, comprising:

a first damping pin protruding from the first moving body, and a second damping pin protruding from the second moving body, wherein the first damping pin and the second damping pin are insertable into the through-hole.

11. The camera module of claim 1, further comprising:

a driving portion configured to drive the first moving body relative to the housing in the optical axis direction.

12. The camera module of claim 1, further comprising:

a driving portion configured to drive the second moving body relative to the first moving body in the direction orthogonal to the optical axis.

13. The camera module of claim 1, wherein the guide member is disposed between the first moving body and the second moving body.

14. A camera module comprising:

a first moving body, disposed in a housing, configured to move in an optical axis direction;

a second moving body, coupled to the first moving body, configured to move in a direction orthogonal to an optical axis;

a ball member disposed between the first moving body and the second moving body;

a damping gel disposed on one surface of surfaces of the first moving body and the second moving body opposing each other; and a damping pin configured to protrude from a position on the first moving body or the second moving body opposing the damping gel, the damping pin having a portion insertable into the damping gel.

15. The camera module of claim 14, wherein the second moving body is movable in a first direction and a second direction, orthogonal to the optical axis, and the first direction and the second direction are orthogonal to each other.

16. The camera module of claim 14, wherein one of the first moving body and the second moving body has a gel accommodating portion in which the damping gel is accommodated.

17. The camera module of claim 14, wherein the damping gel comprises a viscoelastic material.

18. An electronic device, comprising:

a camera module comprising:

a lens holder, disposed in a housing, configured to move in an optical axis direction;

a carrier configured to move in a direction parallel to the optical axis;

a guide member, disposed between the lens holder and the carrier, coupled to the lens holder and configured to move in a direction orthogonal to the optical axis;

a gel accommodating portion, disposed between either the guide member and the carrier or the guide member and the lens holder, the gel accommodating portion configured to accommodate a damping gel; and a damping pin disposed between either the guide member and the carrier or the guide member and the lens holder.

19. The electronic device of claim 18, wherein a portion of the damping pin is insertable into the damping gel.

20. The electronic device of claim 18, wherein the gel accommodating portion is disposed on a surface of the guide member, and the damping pin is disposed on a surface of the carrier opposing the surface of the guide member.

* * * * *